Patented Oct. 5, 1948

2,450,764

UNITED STATES PATENT OFFICE 2,450,764

ISOMERIZATION OF HYDROCARBONS AND IMPROVED CATALYSTS THEREFOR

Charles O. Meyers, Bartlesville, Okla., assignor to Phillips Petroleum Company, a corporation of Delaware No Drawing. Application January 1, 1944, Serial No. 516,708

27 Claims. (Cl. 260—683.4)

1

This invention relates to the conversion of organic materials, for example hydrocarbons. The invention has particular application to the conversion of paraffinic hydrocarbons. A specific embodiment of the invention relates to an improved metal halide catalyst useful in organic conversions.

Normal paraffins can be isomerized to branched-chain paraffins by contact with an aluminum halide catalyst or other metal halide of the Friedel-Crafts type under suitable conditions, and branched-chain or iso-paraffins can be alkylated with olefins to produce higher iso-paraffins which constitute high octane number gasoline boiling range fuels, likewise by contact with aluminum halide or other Friedel-Crafts type metal halide catalysts under suitable conditions. For example, normal butane, when contacted with aluminum chloride or aluminum bromide at an elevated temperature, undergoes conversion to isobutane, and when a large molecular excess of isobutane is contacted with ethylene or other lower olefin at normal or slightly elevated temperatures in the presence of aluminum chloride or aluminum bromide, the isobutane combines with ethylene or other olefin to produce a mixture of higher iso-paraffinic hydrocarbons boiling within the gasoline boiling point range and having a high octane number. It is conversions of this type to which the present invention is particularly applicable.

Catalysts such as the halides of aluminum, beryllium, boron, zinc, titanium, tin, zirconium, iron, antimony, and other polyvalent metal halides, generally known as Friedel-Crafts type metal halides, have also been used in carrying out various other organic conversions; the alkylation of aromatic hydrocarbons, the cracking of hydrocarbons, the polymerization of unsaturated hydrocarbons, the disproportionation of hydrocarbons, the reaction of phenols with tertiary alkyl halides or alcohols, may be mentioned as examples. The present invention provides improved catalysts which may also be used in carrying out the various organic conversions which may be catalyzed by previously known metal halide catalysts.

The present invention has particular application in the isomerization of saturated hydrocarbons, which may be exemplified by the conversion of normal butane to isobutane, normal pentane to isopentane, methyl cyclopentane to cyclohexane, dimethyl cyclopentane to methyl cyclohexane, etc. The reverse of these isomerizations may also be effected, although there is seldom a commercial demand for such conversions. Ordinarily, then, the invention in a preferred embodiment will involve a conversion of straight-chain paraffins to branched-chain paraffins or of branched-chain paraffins to more highly branched-chain paraffins by isomerization reactions.

The isomerization of normal butane to produce isobutane in the presence of aluminum chloride catalyst activated with hydrogen chloride has become an important commercial process, and my invention is particularly applicable to this process and will be described with especial reference thereto. In the past, aluminum chloride has been used per se, ordinarily in the form of relatively large lumps. The aluminum chloride has also been used successfully in combination with solid supporting materials such as pumice, charcoal, fuller's earth, "Porocel" (a commercially available low-iron-content bauxite), porcelain, silica gel, etc. Certain of these supports appear to be completely inert in so far as aluminum chloride is concerned, while others are believed to have a definite promoting action, thereby producing catalysts considerably more active than those involving the inert materials referred to. In some cases the catalyst combination is prepared outside the reaction zone, while in others it is prepared in situ by methods which may involve sublimation of aluminum chloride onto the carrier material and/or adsorption of aluminum chloride vapors by an adsorptive support or carrier from a gas containing such vapors in minor amounts.

In the use of aluminum chloride or other volatile halide catalysts, considerable difficulty has been encountered due to the volatization or solution of catalysts in vaporous or liquid reactants whereby catalyst is carried out of the reaction zone by the effluent reaction mixture. It has been proposed to prevent the carry-over of aluminum chloride in vaporous isomerization effluents by passing the same through a bed of adsorptive alumina, the object being to adsorb residual aluminum chloride vapors. One aspect of my invention relates to removal of such catalysts from gaseous or liquid streams.

It is an object of my invention to effect organic reactions.

It is a further object to convert saturated hydrocarbons.

Another object is to effect the conversion of paraffin hydrocarbons into other, branched-chain paraffin hydrocarbons.

A further object is to effect the isomerization of normal butane in the presence of a novel catalyst comprising an aluminum halide, such as aluminum chloride.

A further object is to provide a new, highly active metal halide catalyst useful for carrying out organic conversions.

A still further object is to provide an improved aluminum chloride-activated charcoal catalyst.

Yet another object is to provide a means of recovering residual sublimed aluminum chloride from a vaporous isomerization effluent.

Further objects and advantages of the invention will be apparent, to one skilled in the art, from the accompanying disclosure and description.

In accordance with my invention a particularly active and useful catalyst may be prepared by treating an adsorbent carbonaceous material, especially and preferably an "active" or "activated" carbon, in a specific manner, and then associating the thus-treated material with a Friedel-Crafts type metal halide. Activated charcoal and other adsorbent carbons or predominately carbonaceous solids have long been used as supports, not only for the metal halides, but also for many other catalytic materials. More often than not, the particular type of carbon used, or the conditions under which it was prepared, have not been disclosed at all, or at least not so fully as to enable the reproduction at will of the same catalyst composite. By the procedure of the present invention, however, an improved catalyst is made available which, due to the method of preparation, has a more predictable and uniform action than many heretofore available. Briefly stated, the catalyst is prepared in a way which enables a close control of the water content of the carbonaceous support prior to mixing or impregnation with the active catalytic component, that is the metal halide. In a preferred embodiment, taking activated wood charcoal as an example, the charcoal, previously activated in accordance with well-known principles, is first heated to an elevated temperature, preferably above about 1800° F., to eliminate excess water and bring it to a substantially constant weight. While some water may be retained in spite of this treatment, possibly in some sort of chemical combination with the surface of the charcoal, the preliminary heating permits of a closer control over the finished product, and is carried out in any suitable manner such that substantially no further water is eliminated by increasing the temperature. The next step involves a controlled hydration of the material, and may be carried out in a number of different ways. The aim is to provide the charcoal with a definite, though relatively minor, content of water. Preferably the water content so imparted is of the order of from less than one per cent by weight, the lower useful limit being about 0.1 per cent, up to about five per cent. The choice of added water content within this range may readily be made by experiment if desired, and the optimum value will be dependent upon the particular carbonaceous support used, the particular metal halide used, the method of combining the metal halide with the support, the conversion to be catalyzed, and the reaction conditions to which the catalyst will be subjected. The water referred to may be added to the support by spraying liquid water onto the support, passing superheated steam through the support, contacting the support with an inert gas such as helium, nitrogen, methane, butane, etc. containing water vapor, or by many other methods which will readily occur to one skilled in the art. It is of course desirable to have as uniform a wetting as possible, and the vapor-phase methods are more adapted to provide such a result than are methods such as spraying. The preferred method involves passage of a stream of nitrogen having a minor proportion of water vapor, for example ten per cent, over the support at an elevated temperature, such as from 250–500° F., at a flow rate sufficiently rapid that the water content of the exit gas does not differ greatly from that of the inlet gas. The gas is desirably recirculated, with water vapor being added to maintain the desired value. In this manner of hydrating, water is adsorbed from the gas quite evenly throughout the body of charcoal.

Having thus hydrated the charcoal to the desired extent it is next admixed with the chosen metal halide catalyst, for example aluminum chloride. This mixing may be done by any means known to the art, such as admixture of the hydrated carbon with molten aluminum chloride, admixture of powdered aluminum chloride with powdered hydrated carbon followed by partial fusion and/or pelleting of the mixture, etc. A preferred method of preparing the catalyst is to pass over a body of granulated hydrated charcoal a stream of hydrocarbon or other vapors carrying sublimed aluminum chloride therein. The charcoal has considerable affinity for the aluminum chloride and adsorbs the same from the vapor stream referred to. In this manner an even and intimate impregnation of the support is obtained, a convenient method of working is had, and a relatively small amount of the expensive aluminum chloride is used in preparing a catalyst of given activity. The amount of aluminum chloride to be used is somewhat a matter of choice, and again is dependent on factors such as those affecting the amount of water used. While some interaction between the added water and the added aluminum chloride undoubtedly occurs, the exact nature of such action, which takes place on the active surfaces of the carbon, is difficult if not impossible to ascertain. However, there is no necessity for postulating any particular mechanism, and I am content to observe that a very desirable catalyst is produced, by the manner of operating disclosed herein. Such catalysts are more active than those prepared from the carbonaceous matter after heating as described and before hydrating, and are of a much more uniform and reproducible activity than those formed from carbonaceous matter not treated in accordance with my invention. Generally an amount of aluminum chloride or other metal halide approximating the stoichiometric equivalent of the added water will produce an active catalyst. The minimum lies within the range of from about 2 to about 6 parts of aluminum chloride per one part of added water by weight. This range is mainly below the stoichiometric value. While part of the water reacts with the aluminum chloride to give hydrogen chloride plus aluminum oxide and/or aluminum oxychlorides, a part is apparently so intimately associated with the active surfaces of the carbon that a destruction of the metal halide by reaction therewith does not occur, and aluminum chloride in the free or at least readily available or catalytically active state remains. Of course, a considerable excess of the aluminum chloride over the minimum amount just set forth may be used, often to considerable advantage. The optimum metal halide content is largely a matter of an economic balance among various factors, as will be readily appreciated by one skilled in the art.

As examples of the various carbonaceous materials which may be utilized in the practice of the present invention may be mentioned: petroleum coke; carbon black, preferably of the "soft" variety although channel blacks are also utilizable; lamp black; charcoal from wood or other vegetable matter, bone, blood, etc. Preferably the carbonaceous matter has the properties of "active" or "activated" carbon. Thus McBain, states that "in practice one distinguishes two kinds of amorphous charcoal or carbon, active and inactive" (McBain, "The Sorption of Gases by Solids," George Routledge & Sons, Ltd., London, 1932, see chapter IV). Although referred to as "amorphous," X-ray examination indicates a space lattice similar to that of graphite. It is carbon in such an active form, from one of numerous sources, which constitutes the desired base material from which I prepare a catalyst. Ordinarily, in the preparation of active carbon, a carbonaceous material is carbonized, preferably at temperatures below 500° C. If the material is properly carbonized, it has a uniform, characteristic black color. Experimental work over a considerable range has shown that when free carbon is liberated from its compounds below this temperature by carbonization, it is either active or capable of activation, while carbon produced at temperatures higher than this are ordinarily shown to be inactive and not capable of activation. The char resulting from carbonization may be activated through a process of slow oxidation by heating to temperatures ranging from 500-1100° C. or higher, most frequently in the presence of air, steam or $CO_2$ as the oxidizing agent. All modes of activation seem to consist in the removal of material in contact with the atoms of carbon, chiefly by oxidation. Such materials may be hydrocarbons, tar, films of oxide, or portions of the carbon chains themselves. Even mere heating in vacuo involves expulsion of large amounts of the oxygen inevitably present, which will come off as a mixture of carbon monoxide and dioxide. Consequently, considerable loss of carbon is also involved. Often inorganic substances are added to supply an atmosphere of carbon dioxide or, as in the case of zinc chloride and phosphoric acid, to effect dehydration. Depending upon the source and method of treating the raw material and the desired quality of final product, the recovery of activated carbon may amount to only 10–50% of the char. It is to be understood that the foregoing description of carbon activation methods is not limiting, but merely exemplary in nature. Obviously the exact nature of the final catalyst product will be a function of the source of carbonaceous material, the treatment to which the same is subjected, the amount of water and metal halide added in accordance with this invention and the particular metal halide used. It will of course be appreciated that while all the catalysts of my invention have certain characteristics in common, the various different specific catalysts contemplated will not necessarily be full equivalents under all circumstances.

By way of example, the use of the principles of my invention in effecting the vapor phase isomerization of normal butane to isobutane will be described using aluminum chloride-activated charcoal catalyst. In one manner of operating, two catalyst chambers are provided, the first containing lump anhydrous aluminum chloride and the second containing 4–14 mesh granular activated wood charcoal. This charcoal may have been previously heated to 1500° F., but preferably this heating is effected with the charcoal in place in the secondary chamber. Subsequent to the heating a rapid stream of superheated steam is passed through the charcoal until about two weight per cent water is adsorbed. The chamber is then flushed out with gaseous normal butane to remove unadsorbed water vapor therefrom. The temperature of the chamber is brought to about reaction temperature if necessary.

A stream of normal butane is heated to about 200° F. and anhydrous hydrogen chloride activator is added to produce a mixture containing 5 mol per cent hydrogen chloride. The resulting stream of vapors is passed through the first chamber containing aluminum chloride wherein conversion to isobutane occurs to the extent of say 10 to 20 per cent. A small amount of aluminum chloride is also vaporized under these conditions and is present in the effluent stream from the first chamber. This stream is next passed through the second chamber containing charcoal, and when first put into operation the aluminum chloride is substantially completely adsorbed from the gas stream passing therethrough. The resulting aluminum chloride-free isomerization effluents are then passed to conventional separation steps for recovery of the isobutane product, and recycle hydrogen chloride and normal butane streams. It will be seen that by this operation a complete removal of volatized aluminum chloride is effected. Accordingly, portions of the equipment downstream of the secondary chamber may be operated without an undesirable condensation of aluminum chloride therein. At first very little or no conversion occurs in the secondary chamber; however, after a relatively short induction period which may usually range from a few hours up to about a day or two, depending upon the conditions used, sufficient aluminum chloride is adsorbed by the charcoal to produce a catalytically active mass in the secondary chamber. The effluent vapors from the secondary chamber ordinarily remain free of aluminum chloride until the aluminum chloride content of the catalyst in the secondary chamber reaches at least several per cent. After a short induction period mentioned, substantial further conversion of normal butane to isobutane occurs in the secondary chamber, so that an effluent containing, for example, from 30 to 60 per cent isobutane is readily obtainable. When the effluents from the secondary chamber are no longer free from aluminum chloride the stream may be passed through a fresh bed of prepared charcoal to prevent aluminum chloride carryover. Aluminum chloride vapors, however, may still be introduced into the secondary chamber continuously or intermittently to maintain the catalytic activity thereof and to make up for loss of aluminum chloride in effluents. The catalyst may thus be used for a long period of time. A bed of prepared charcoal may advantageously be used first to remove aluminum chloride from effluents and then as a catalyst. With suitable modifications, based on the nature of the materials in question, operations similar to those described in United States Patent 2,281,924 wherein adsorptive alumina is used, may be carried out using an adsorbent carbonaceous material prepared as described, in accordance with my invention. Other methods of combining the property of adsorbing aluminum chloride from vapors and the property of being catalytically active will readily occur to one skilled in the art. Merely as another example, a series of steps somewhat similar to some of those disclosed in United States Patent 2,323,830 may be employed.

While I have described various aspects of my invention with particular reference to an aluminum chloride-activated wood charcoal combination as applied to the vapor phase isomerization of normal butane in the presence of hydrogen chloride as catalyst activator, it will be appreciated that other combinations of the nature described may with suitable modifications be made and used for the same or different conversions without departing from the spirit and scope of the invention.

I claim:

1. A process for the conversion of normal butane to isobutane which comprises passing a gaseous stream containing normal butane and catalyst-activating amounts of hydrogen chloride through a bed of solid anhydrous aluminum chloride at isomerization conditions of temperature and pressure whereby isobutane is produced and aluminum chloride vapors are incorporated in said stream, and passing the resulting stream through a bed of activated wood charcoal prepared as described below, at isomerization conditions of temperature and pressure whereby aluminum chloride from said stream becomes incorporated in said bed and further amounts of isobutane are produced, said charcoal having been prepared by heating activated wood charcoal to a temperature of at least about 1500° F., and then incorporating water therewith in a controlled amount up to about five weight per cent by passage of superheated steam therethrough immediately prior to passage therethrough of the aforesaid stream containing aluminum chloride vapors.

2. The process of claim 1, in which said stream after contact with said bed of prepared charcoal contains residual aluminum chloride and is passed through an additional amount of such charcoal freshly prepared, whereby substantially all said residual aluminum chloride vapors become incorporated with said fresh charcoal, and recovering isobutane from the resulting aluminum chloride-free stream as a product of the process.

3. A process for the conversion of normal butane to isobutane which comprises passing a gaseous stream containing normal butane into contact with an anhydrous aluminum halide at elevated temperatures to incorporate vapors of aluminum halide in said stream, and passing the resulting stream at isomerization conditions of temperature and pressure into contact with a pretreated adsorbent carbonaceous material having a minor amount of aluminum halide incorporated therewith and in the presence of catalyst-activating amounts of the corresponding hydrogen halide to effect isomerization of said normal butane to isobutane, said adsorbent carbonaceous material having been pretreated by heating same to a temperature such that substantially no further water may be driven off at higher temperatures and then hydrated to give a controlled added water content of from about 0.1 to about 5.0 per cent by weight.

4. The process of claim 3, in which said aluminum halide is aluminum chloride and said hydrogen halide is hydrogen chloride.

5. The process of claim 3, in which said adsorbent carbonaceous material as an "active" carbon.

6. The process of claim 3, in which said adsorbent carbonaceous material is carbon black.

7. A process which comprises isomerizing normal butane to isobutane in the presence of a catalyst prepared by substantially dehydrating an activated wood charcoal at elevated temperatures, hydrating the same by exposure to a gas containing water vapor until a substantial controlled amount of water up to about 5 weight per cent is adsorbed by said charcoal, and incorporating catalytically effective amounts of anhydrous aluminum chloride therewith.

8. A process for converting saturated hydrocarbons into other, branched-chain saturated hydrocarbons, which comprises contacting a reaction mixture comprising saturated hydrocarbons at reaction conditions with a catalyst comprising an active carbon which has been previously subjected to the following treatment: heated to an elevated temperature of at least about 1800° F. to drive off substantially all its free water content, contacted with water to adsorb thereon a minor controlled amount of water ranging up to about 5 weight per cent, and admixed with an anhydrous Friedel-Crafts type metal halide catalyst in catalytically effective amounts.

9. In organic conversion processes employing an anhydrous Friedel-Crafts type metal halide catalyst, the improvement which comprises employing a catalyst comprising such an anhydrous metal halide incorporated with an adsorbent charcoal which, immediately previous to said association with said metal halide, has been exhaustively dried at an elevated temperature and then hydrated to a controlled added water content of less than about 5 per cent by weight.

10. A method of preparing a catalyst which comprises subjecting an adsorbent carbonaceous material to elevated temperatures under conditions such that substantially no water may be removed by heating to higher temperatures, contacting thus-dried material with water under conditions to provide said material with a small but substantial and controlled content of water below about 5 weight per cent, and impregnating thus-hydrated material with catalytically effective amounts of an anhydrous Friedel-Crafts type metal halide.

11. The method of claim 10, in which said adsorbent carbonaceous material is an active carbon.

12. The method of claim 10, in which said contacting with water is accomplished with the water in the vapor phase.

13. The method of claim 10, in which said hydrated material is contacted with vaporous anhydrous metal halide and adsorbs catalytically effective amounts of said vapors.

14. A method of preparing a catalyst which comprises subjecting activated wood charcoal to a temperature of at least about 1800° F. for a time sufficient to substantially dehydrate said charcoal, then contacting said charcoal with a gas containing water vapor under conditions causing said charcoal to adsorb a controlled amount of water ranging from about 0.1 to about 5.0 per cent water by weight, and then incorporating with said charcoal containing said water anhydrous aluminum chloride in catalytically effective amounts at least stoichiometrically equivalent to said adsorbed water.

15. A catalyst useful in effecting organic conversions prepared by subjecting an adsorbent carbonaceous material to elevated temperatures under conditions such that substantially no water may be removed by heating to higher temperatures, contacting thus-dried material with water under conditions to provide said material with a small but substantial and controlled content of water below about 5 weight per cent, and incorporating with the thus-hydrated material catalytically effective amounts of an anhydrous Friedel-Crafts type metal halide.

16. An improved Friedel-Crafts type catalyst prepared by subjecting an active carbon to elevated temperatures under conditions such that substantially no water may be removed by heating to higher temperatures, contacting the thus-dried carbon with water under conditions to provide said carbon with a small but substantial and controlled content of water below about 5 weight per cent, and impregnating the thus-hydrated carbon with catalytically effective amounts of an anhydrous Friedel-Crafts type metal halide.

17. A catalyst useful in effecting organic conversions prepared by subjecting an adsorbent carbonaceous material to elevated temperatures under conditions such that substantially no water may be removed by heating to higher temperatures, contacting thus-dried material with water in the vapor phase under conditions to provide said material with a small but substantial and controlled content of water below about 5 weight per cent, and incorporating with the thus-hydrated material catalytically effective amounts of an anhydrous Friedel-Crafts type metal halide.

18. A catalyst useful in effecting organic conversions prepared by subjecting an adsorbent carbonaceous material to elevated temperatures under conditions such that substantially no water may be removed by heating to higher temperatures, contacting thus-dried material with water under conditions to provide said material with a small but substantial and controlled content of water below about 5 weight per cent, and immediately contacting thus-hydrated material with a vaporous anhydrous Friedel-Crafts type metal halide under conditions to effect adsorption of catalytically effective amounts of said anhydrous metal halide by said hydrated carbonaceous material.

19. An improved aluminum chloride catalyst useful in isomerizing isomerizable saturated hydrocarbons, said catalyst being prepared by subjecting activated wood charcoal to a temperature of at least about 1800° F. for a time sufficient to substantially dehydrate said charcoal, then contacting said charcoal with a gas containing water vapor under conditions causing said charcoal to adsorb a controlled amount of water ranging from about 0.1 to about 5.0 per cent water by weight, and then impregnating said charcoal containing said water anhydrous aluminum chloride in catalytically effective amounts at least stoichiometrically equivalent to said adsorbed water.

20. The process of claim 8, in which said reaction mixture comprises alkylatable paraffin hydrocarbons as said saturated hydrocarbons and olefins, and in which said reaction conditions effect the conversion of said saturated hydrocarbons by alkylation reaction into higher boiling branched-chain high octane number motor fuel range hydrocarbons as said other, branched-chain saturated hydrocarbons.

21. The process of claim 8, in which said Friedel-Crafts type metal halide is aluminum chloride.

22. The process of claim 8, in which said Friedel-Crafts type metal halide is aluminum bromide.

23. In organic conversion processes employing an anhydrous Friedel-Crafts type metal halide catalyst, the improvement which comprises employing a catalyst comprising such an anhydrous metal halide incorporated with an adsorbent carbonaceous material which, immediately previous to said incorporation with said metal halide, has been subjected to elevated temperatures under conditions such that substantially no water may be removed by heating to higher temperatures and then hydrated to a controlled added water content of less than 5 per cent by weight.

24. In organic conversion processes employing an anhydrous Friedel-Crafts type metal halide catalyst, the improvement which comprises employing a catalyst comprising such an anhydrous metal halide incorporated with an active carbon which, immediately previous to said incorporation with said metal halide, has been heated to elevated temperatures of at least about 1800° F. to drive off substantially all its free water content and then hydrated to a controlled added water content of less than 5 per cent by weight.

25. In organic conversion processes employing an anhydrous aluminum chloride catalyst, the improvement which comprises employing a catalyst comprising anhydrous aluminum chloride incorporated with an active carbon which, immediately previous to said incorporation with said metal halide, has been exhaustively dried at an elevated temperature and then hydrated to a controlled water content of less than 5 per cent by weight.

26. The method of claim 10, in which said Friedel-Crafts type metal halide is aluminum chloride.

27. A catalyst as defined in claim 16 in which said Friedel-Crafts type metal halide is aluminum chloride.

CHARLES O. MEYERS.

REFERENCES CITED

The following references are of record in the file of this patent:

UNITED STATES PATENTS

| Number | Name | Date |
| --- | --- | --- |
| 2,100,352 | Pier et al. | Nov. 30, 1937 |
| 2,169,494 | Ipatieff et al. | Aug. 15, 1939 |
| 2,277,022 | McMillan et al. | Mar. 17, 1942 |
| 2,309,263 | Thomas | Jan. 26, 1943 |
| 2,324,746 | Weinrich et al. | July 20, 1943 |
| 2,342,922 | Danforth | Feb. 29, 1944 |
| 2,344,467 | Reeves | Mar. 14, 1944 |
| 2,346,768 | Laughlin | Apr. 18, 1944 |
| 2,351,354 | McMillan | June 13, 1944 |
| 2,354,851 | Danforth | Aug. 1, 1944 |

Certificate of Correction

Patent No. 2,450,764.                                                October 5, 1948.

CHARLES O. MEYERS

It is hereby certified that errors appear in the printed specification of the above numbered patent requiring correction as follows:

Column 7, line 36, claim 1, strike out "a" after "in"; column 9, line 61, claim 19, insert the word *with* before "anhydrous";

and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*